(12) United States Patent
Hasani

(10) Patent No.: US 6,625,167 B1
(45) Date of Patent: Sep. 23, 2003

(54) METHOD AND APPARATUS FOR DS3 PENTAD-BASED PROCESSING

(75) Inventor: Naader Hasani, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/378,410

(22) Filed: Aug. 20, 1999

(51) Int. Cl.[7] .............................. H04J 3/16; H04J 3/22
(52) U.S. Cl. ..................... 370/466; 370/503; 370/476
(58) Field of Search ............................... 370/466, 465, 370/470, 471, 472, 545, 461, 467, 469–476, 498, 503, 506, 514, 522, 389, 392, 442, 400, 907, 512

(56) References Cited

U.S. PATENT DOCUMENTS

| | | | |
|---|---|---|---|
| 5,621,720 A | * | 4/1997 | Bronte et al. ............... 370/241 |
| 6,058,120 A | * | 5/2000 | Sabzevari ................... 370/466 |
| 6,330,224 B1 | * | 12/2001 | Christie et al. ........ 370/395.51 |
| 6,370,155 B1 | * | 4/2002 | Cantwell et al. ............ 370/465 |

* cited by examiner

*Primary Examiner*—Douglas Olms
*Assistant Examiner*—Brian Nguyen
(74) *Attorney, Agent, or Firm*—Hamilton, Brook, Smith & Reynolds, P.C.

(57) ABSTRACT

A system and method for pentad-based processing are disclosed for efficient processing of DS3 data by converting a DS3 frame to pentad and shuffling the overhead bit in the pentad. A framer searches for F-bits in detecting the column boundary alignment and M-bits in detecting the row boundary alignment to produce a control signal to a barrel shifter for adjusting the overhead bit position to the most significant bit position of a pentad. The F-bits and M-bits alignments require that F-bits or M-bits are detected in a predetermine number of consecutive frames. Upon proper framing, a converter converts the pentad back to a DS3 frame at the output for processing with other interfaces.

19 Claims, 4 Drawing Sheets

METHOD AND APPARATUS FOR DS3 PENTAD-BASED PROCESSING

FIELD OF INVENTION

The present invention relates generally to communication systems, and more particularly to method and apparatus for processing DS3 (Digital Signal Level 3) signals.

BACKGROUND OF INVENTION

DS3 is a popular bit serial protocol for carrying voice and data signals over a single transmission facility. A DS3 frame contains 7 rows and 8 columns for each row where each column or block stores 85 bits of data. A shortcoming of DS3 protocol is that the bit alignment within a DS3 frame will rotate around the byte boundaries, which presents challenges to designers in the implementation of the DS3 bit serial protocol. The logic circuits in a DS3 processing can be simplified significantly if every DS3 frame can be arranged so that the overhead bit is placed at the most significant bit position in a shorter and efficient data format.

For additional background information on DS3 framing, the reader is referred to the DS3 standard as adopted in ANSI T1.107 (1995). The content of this document is incorporated herein by reference.

Accordingly, it is desirable to have a method and system for processing DS3 frames with a more efficient approach in simplifying the complexity of the implementation.

SUMMARY OF INVENTION

The present invention overcomes the foregoing limitations by disclosing a pentad-base system, comprising (1) a first converter having an input for receiving an input data having a specified format, the first converter converting the input data to a pentad, the first converter having an output for generating the pentad; (2) a framer having an input and an output, the framer determining the location of an overhead bit in the pentad and generating a control signal; (3) a barrel shifter having a first input coupled to the output of said first converter, a second input coupled to the output of said framer, and an output coupled to the input of said framer, said barrel shifter receiving a control signal from the framer indicating the number of shift to place the overhead bit at the most significant bit position, said barrel shifter shifting an overhead bit to the most significant bit position.

The pentad-based system in the present invention advantageously affixes the location of the overhead bit so that the column and row boundary alignments within a DS3 frame is clearly known. After a framer has found F-bits, the barrel shifter shifts the overhead bit to the most significant bit location of a pentad. Then the framer searches for the M-bits at the most significant location of the pentads, and once the framer has found the M-bit alignment, the framer declares in-Frame condition. The placement of the overhead bit in a DS3 frame at the most significant bit position simplifies the designs and verifications of DS3 processing.

DETAILED DESCRIPTION OF PREFERRED EMBODIMENT(S)

Figure 1:
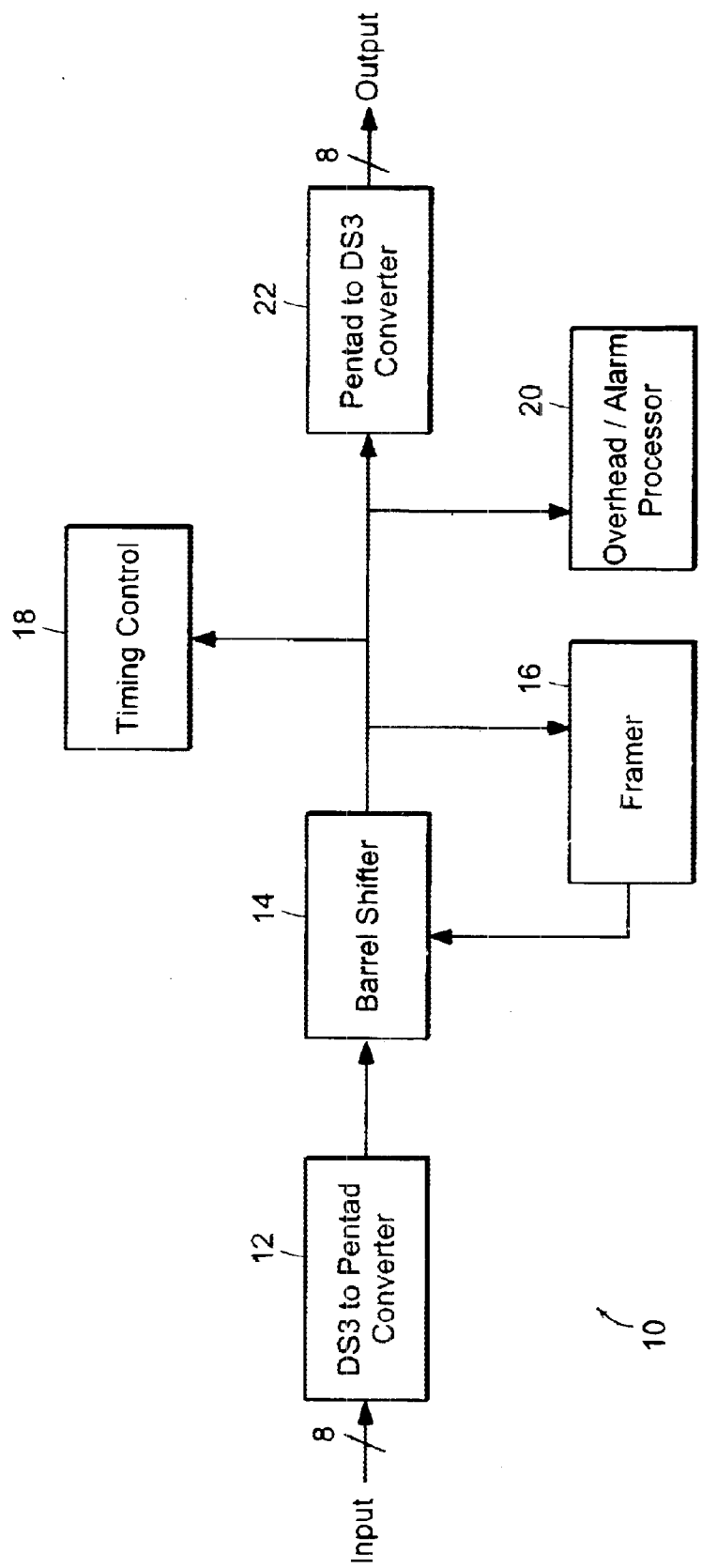
FIG. 1 is a general block diagram illustrating the implementation of the DS3 pentad-based system in accordance with the present invention.

FIG. 1 is a general block diagram illustrating the implementation of the DS3 pentad-based system 10 in the present invention, including a DS3 to pentad converter 12, a barrel shifter 14, a framer 16, a timing control 18, an overhead/alarm processor 20, and a pentad to DS3 converter 22. The computation in the DS3 pentad-based system 10 can be divided into three stages. The first stage involves the DS3 to pentad converter 12, the second stage involves the barrel shifter 14, the framer 16, and the timing control 18, and the last stage involves the overhead/alarm processor 20 and the pentad to DS3 converter 22.

At the start of the process, the DS3 to pentad converter 12 receives an input stream with a certain bit format, such as an 8-bit octet which is a widely used industrial standard for interfacing between electronic devices. The DS3 to pentad converter 12 extracts the DS3 data bits and converts the input stream from 8-bit data to 5-bit data, or pentad, along with a pentad valid signal indicating that the pentad is now valid for processing. In one embodiment, the processing clock should operate at a speed greater than the DS3 rate (44 MHz). An example in the application of DS3-pentad processing is when Sonet OC-n is channelized into DS3. The higher clock speed allows for producing an extra pentad, when necessary, to avoid accumulating bits when converting octets to pentads. The barrel shifter 14 processes the pentad and generates an output pentad to the framer 16. The framer 16 examines the five bits in the pentad in search for framing bits (F-bits) for column boundary alignment and M-bits for row boundary alignment according to an algorithm in order to determine if the overhead bit is aligned or mis-aligned. After the framer 16 has determined the column and row boundary alignments, the framer 16 transmits the results to the timing control 18 and overhead/alarm processor 20. The timing control 18 generates the timing markers such as a pulse that represents the F1 time. Within that clock cycle where F1 time is high, the framer 16 notifies the overhead/alarm processor 20. The most significant bit of the pentad in that clock cycle will remain F1, which eliminates the uncertainty of bit information when a pulse is generated.

The conversion from DS3 to pentad processing is suitable since a pentad is divisible as an integer into a column or block. A block contains 85 bits of data that is divisible by 5 to generate 17 pentads. The integer divisibility of pentad to DS3 thus eliminates the uncertainty that arises from the rotation of bits around a byte boundary.

Figure 2:
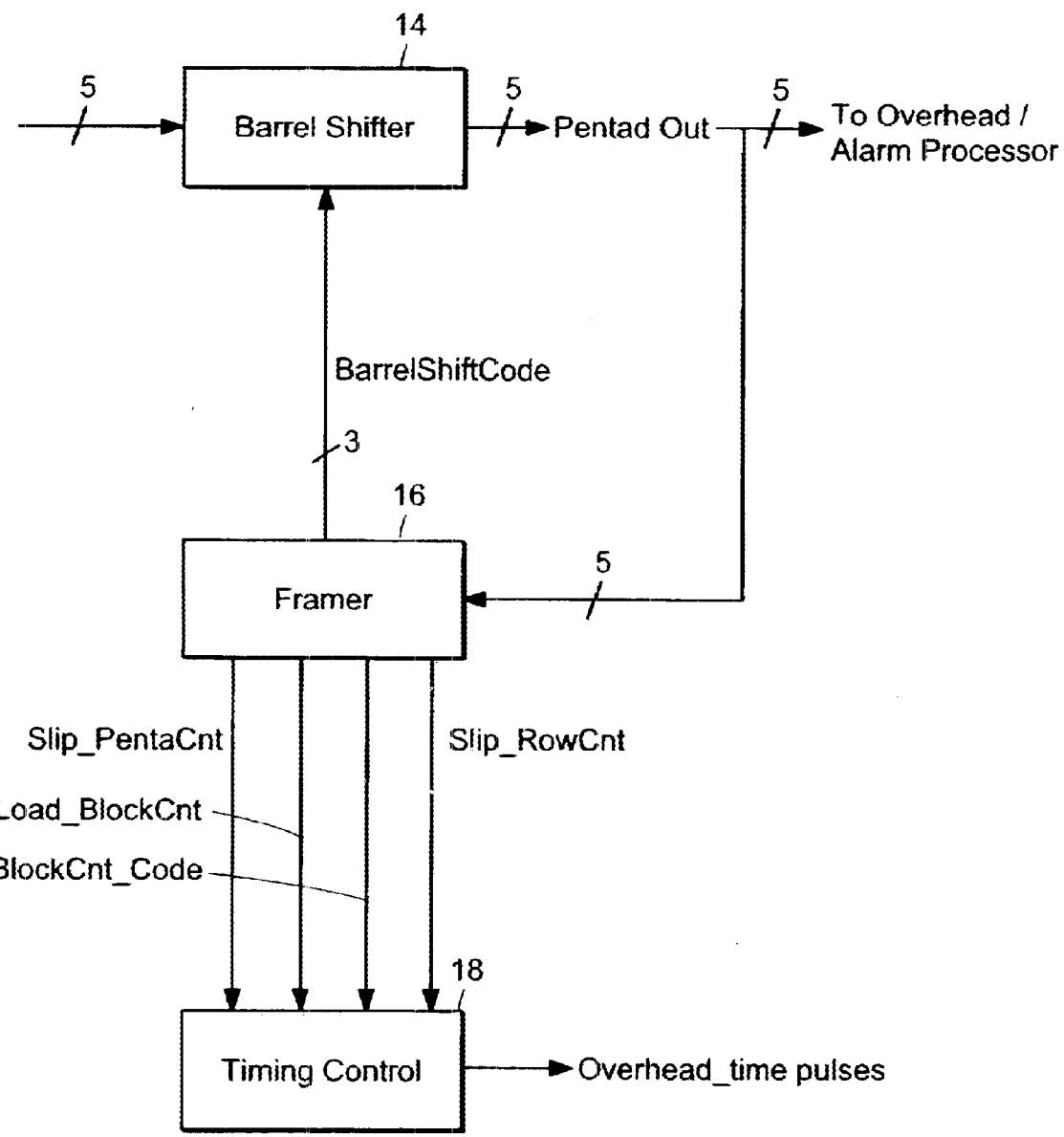
FIG. 2 is a block diagram illustrating the signal couplings in framing a pentad in accordance with the present invention.

FIG. 2 is a block diagram illustrating the signal couplings in framing a pentad in accordance with the present invention. The barrel shifter 14 receives a pentad from the DS3 to pentad converter 12 and generates a pentad out to the framer 16 and the overhead/alarm processor 20. The framer 16 receives the pentad and assumes arbitrary alignment of an overhead bit within the pentad. The framer 16 analyzes the pentad by a framing algorithm as described in FIG. 3 to determine the row and column boundary alignments in a DS3 frame. The framer 16 generates "slip_pentaCnt", "slip_rowCnt", "load_blockCnt" and "blockCnt_code" signals to the timing control 18 to ensure that the framer 16 does not leave any gap behind while the framer 16 searches for the correct F-bit and M-bit alignments, and to choose one of the four F-bit search engines as the master. To reduce the frame acquisition time, particularly when DS3 frame contains Internet type data that may contain a high number of pseudo F-bits, the pentad framer 16 makes use of four parallel F-bit search engines that work with 90 degrees phase difference with respect to one another. This means that a pentad is examined for F1, F2, F3, and F4 bits at the same time. The engine that confirms the F-bit becomes the master and the timing control 18 loads the corresponding block count into the block counter. Once the framer 16 has found the location of the F-bit, the framer 16 sends a barrelShiftCode signal to the barrel shifter 14 indicating the number of binary shifts, if any, that are required to place the overhead bit in the most significant bit position.

For example, suppose a pentad is framed with the bit order as bit 0, bit 1, bit 2, bit 3, and bit 4 from right to left, with the most significant bit designated as the leftmost bit position in a pentad. In this example, the pentad has a mis-alignment where the overhead bit is at the bit 2 location of the pentad rather than at the bit 4 location. The framer 16 sends a barrelShiftCode signal to the barrel shifter 14 indicating that the barrel shifter 14 must shift twice to the left of the pentad so that the overhead bit is shifted to the bit 4 position in the pentad where the most significant bit location is designated. Consequently, the barrel shifter 14 will generate a pentad output that has the overhead bit at the bit 4 position.

Figure 3:
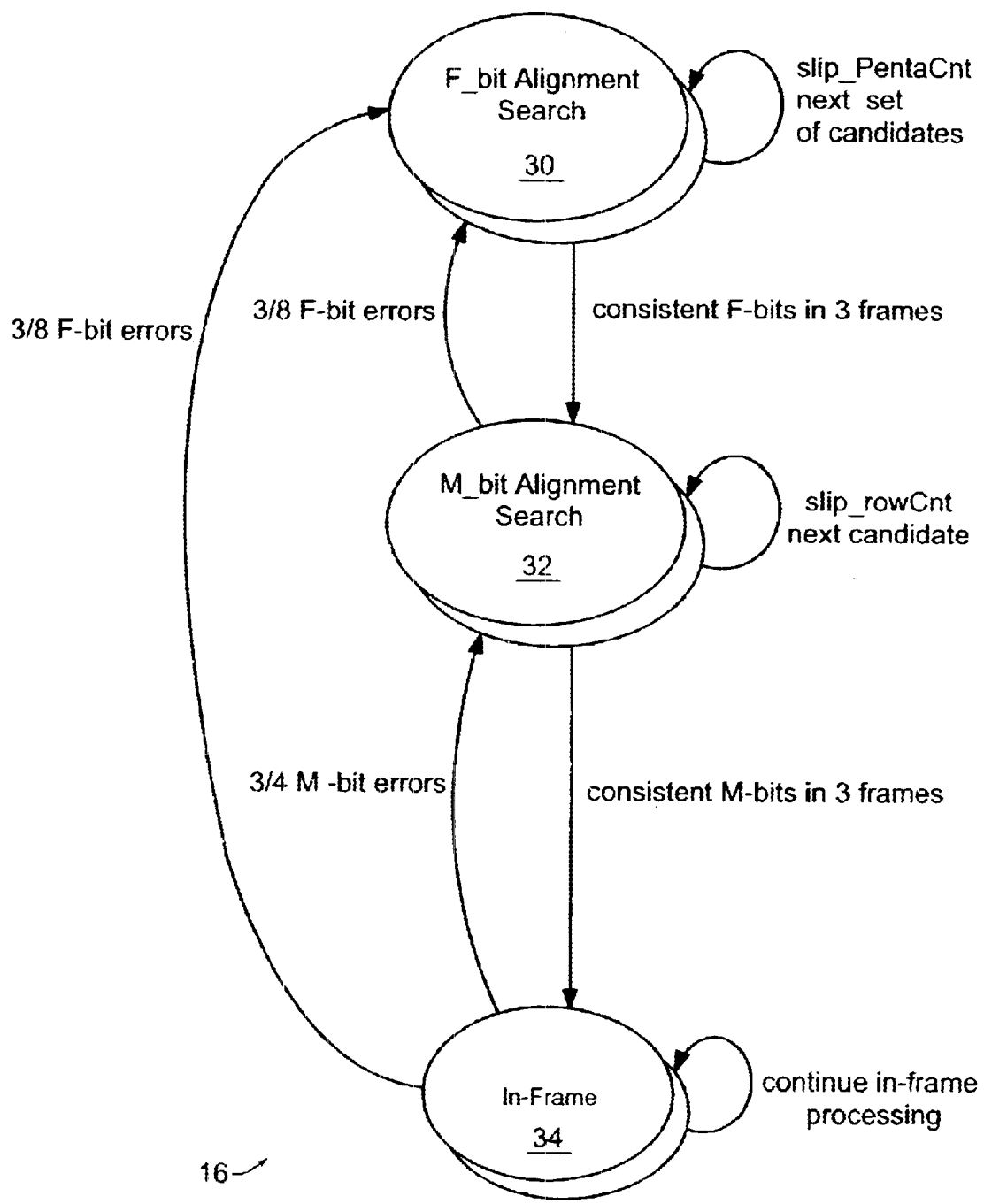
FIG. 3 is a state machine diagram illustrating the framing algorithm of DS3 state transitions in accordance with the present invention.

FIG. 3 is a state machine diagram illustrating the framing algorithm of DS3 state transitions in the present invention. The framing algorithm for DS3 executes two searches, a row boundary search of the F-bits alignment of F1, F2, F3, and F4, and the column boundary search of M-bits alignment of M1, M2, M3. The finding of F-bits will reveal the correct-reading location of a specific column and a specific bit of that column within a DS3 frame. Given that each row contains eight columns, the F-bits will identify which column of the eight columns in the row that the framer 16 is accessing. Additionally since each column contains 85 bits, the F-bits will also identify the starting location of the 85-bit column that contains the overhead bit or the specific bit location within the 85-bit column.

The M-bits will reveal the correct-reading location of a specific row since the F-bits function in the same manner for every row. With each frame containing rows one to seven, the M-bits will indicate the specific row in which the framer 16 is accessing. In DS3 processing, a frame must be acquired and implemented within 1.5 ms in the presence of $10^{-3}$ bit error rate, which includes the search time in finding the F-bits and M-bits. In one embodiment, the maximum average frame acquisition time in a pentad framer with four parallel F-bit engines is about 1.3 ms.

For every row in a DS3 frame, the DS3 pentad-based system 10 searches for F bits that contain a binary sequence of "1001". At a state 30, the framer 16 examines 5 F-bit candidates in the pentad simultaneously in search for the correct F-bit. An F-bit candidate is dropped when one discrepancy is found between the received F-bit and the expected one. In one embodiment, an F-bit candidate is confirmed when no mismatches are found in 10/3 consecutive DS3 frames (280/84 consecutive correct F-bits received). The predetermined set of consecutive frames for F-bits is programmable by a user to set the condition and threshold in which the framer 16 determines that no mismatches have been found. Once a correct F-bit has been detected, the framer 16 marks the location of that F-bit, and 170 bits later, the framer 16 will expect the occurrence of the next F-bit. When the next set of candidates is ready to be examined by the framer 16, the signal "slip_pentaCnt" is generated to retrieve the next set of candidates for F_bit alignment search at the state 30.

At a state 32, after the F-bits have been found, the framer 16 searches for the M-bit alignment which are 3-bits wide and follows a pattern of "010" between DS3 frames. If the framer 16 determines that the retrieved row does not contain the M-bits, then the framer 16 retrieves the next candidate. The framer 16 will continue this iterative process until the correct M-bits are found that follows the pattern of "010" for a predetermined set of consecutive frames. In one embodiment, the M-bits are confirmed if no mismatches are found in three consecutive frames. Similarly, the predetermined set of consecutive frames for M-bits is programmable by a user to set the condition and threshold in which the framer 16 determines that no mismatches have been found.

While searching for the M-bit alignment or while a pentad is InFrame, the framer 16 declares SEF ("Severly Errored Frame") upon detecting 3 F-bit mismatches in a sliding window of 8/16 F-bits (programmable) and returns to the state 30 to search for the F-bit alignment. When the next set of candidates is ready to be examined by the framer 16, the slip_rowCnt signal is generated to retrieve the next candidates for M-bit alignment search at the state 32. At a state 34, while InFrame the framer 16 returns to the state 32 in search for the M-bit alignment upon detecting three M-bit errors in a sliding window of four frames. A frame is an M-bit errored frame if the frame contains one or more unmatching M-bits. Once both F-bits and M-bits are confirmed, the framer 16 declares Inframe. The framer 16 will notify the timing control 18 of the location of a specific column or specific block and the location of the specific row in a DS3 frame. Consequently, full framing is completed because the framer 16 has determined the exact column and row alignments in that DS3 frame.

Figure 4:
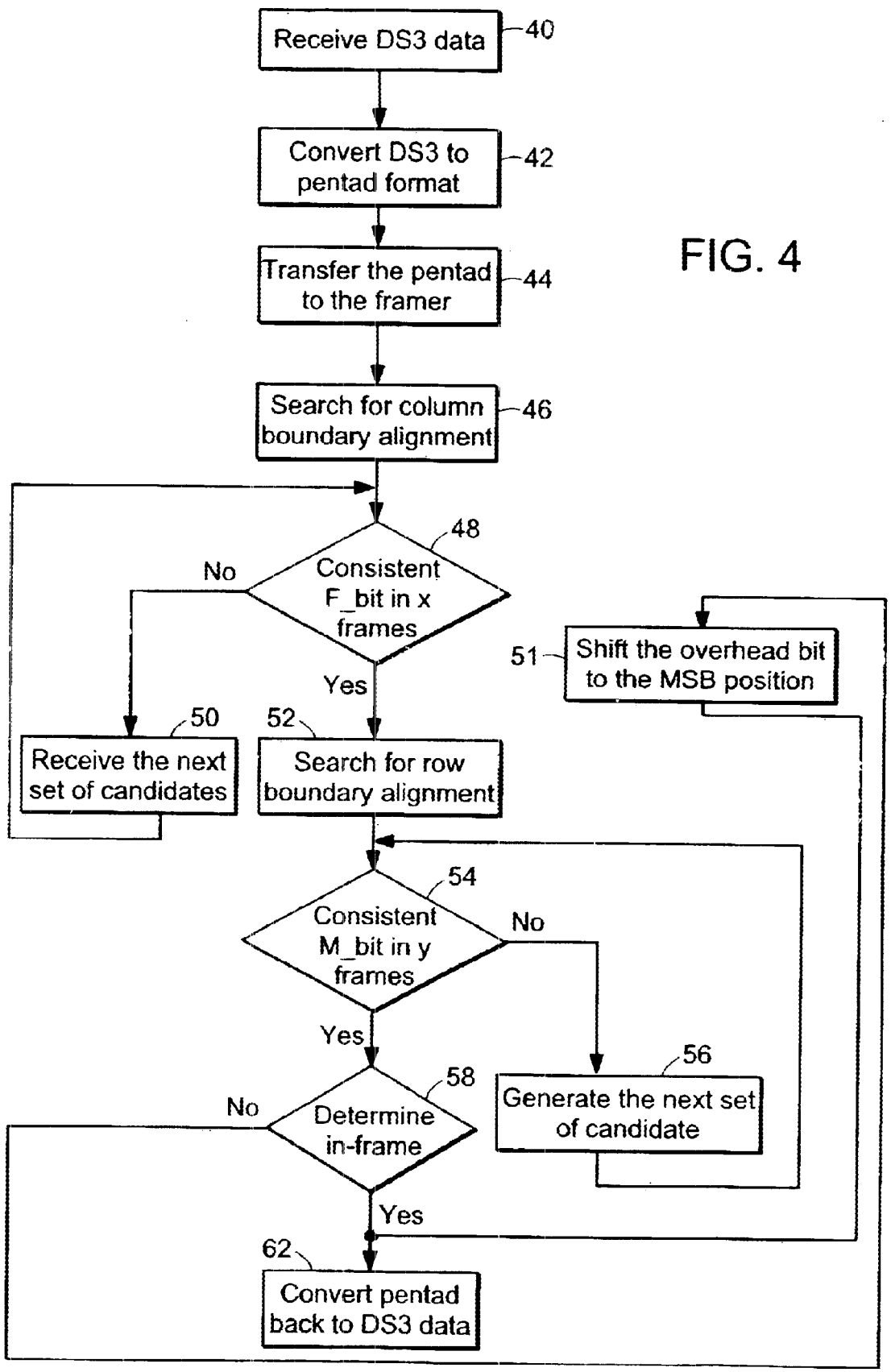
FIG. 4 is a flow chart illustrating the process for implementing the DS3 pentad-based system in accordance with the present invention.

FIG. 4 is a flow chart illustrating the process for implementing the DS3 pentad-based system in the present invention. At a step 40, the DS3 pentad-based 10 receives a DS3 input data with an octet format. At a step 42, the DS3 to pentad converter 12 extracts the DS3 data bits from the DS3 input data and converts 8-bit data to 5-bit pentad. At a step 44, the pentad is transferred to the framer 16 to determine the location of the overhead bit, as well as the row and column boundary alignments. At a step 46, the framer 16 searches the column boundary alignment by detecting the location of F-bits. At a step 48, if the framer 16 determines that the F-bits have not been consistent or has yet to examine for x consecutive frames, then at a step 50, the next set of candidates is fed back into the step 48. However, if the framer 16 has detected F-bits for the x consecutive frames, then the framer 16 proceeds to a step 52 in search of the row boundary alignment. As noted above, the x number of consecutive frames is user-programmable, with a typical number set at three in one embodiment. At a step 54, the framer 16 determines if an M-bit has been at the designated location for y consecutive frames. If the framer 16 determines that the M-bits have not been consistent or has yet to examine for y consecutive frames, then at a step 56, the next set of candidates is fed back into the step 52. At a step 58, the framer 16 determines whether the frame in question is in-frame. If the frame is mis-aligned, then at a step 51, the barrel shifter 14 shifts the overhead bit to the most significant bit position of a pentad. Upon completion of aligning the overhead bit, at a step 62, the DS3 pentad-based system 10 converts the pentad back to DS3 data.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A pentad-base system, comprising:
    a first converter having an input for receiving an input frame having a specified format, the first converter converting the input frame to a plurality of pentads, the first converter having an output for generating the pentads;
    a framer having an input for receiving the plurality of pentads and an output, the framer determining the location of an overhead bit in one of the plurality of the pentads and generating a control signal;
    a barrel shifter having a first input coupled to the output of said first converter, a second input coupled to the output of said framer, and an output coupled to the input of said framer, said barrel shifter receiving the control signal from the framer indicating the number of shifts to place the overhead bit at the most significant bit position of one of the plurality of pentads, said barrel shifter shifting the overhead bit to the most significant bit position.

2. The pentad-based system of claim 1 further comprising a second converter having an input coupled to the output of said barrel shifter, said second converter converting the pentads to an output data having the same specified format as the input frame, said second converter having an output for generating the output data.

3. The pentad-based system of claim 1 wherein said framer examines a set of candidates in search of an F-bit, an F-bits alignment being found when the F-bit is placed at a consistent location for a predetermined number of input frames.

4. The pentad-based system of claim 3 wherein the F-bits alignment is found when the input frame contains F-bits having a binary sequence of "1001".

5. The pentad-based system of claim 1 wherein said framer examines a set of candidates in search of an M-bit, an M-bits alignment being found when the M-bit is placed at a consistent location for a predetermined number of input frames.

6. The pentad-based system of claim 5 wherein the M-bit alignment is found when the input frame contains M-bits having a binary sequence of "010".

7. The pentad-based system of claim 1 further comprising a timing controller for generating timing markers that represent an overhead time including an F1 time.

8. A method for pentad-based processing of an input frame having a specified data format, comprising the steps of:
    converting the input frame into a plurality of pentads;
    framing the plurality of pentads by determining the location of an overhead bit in one of the plurality of pentads; and
    shifting the overhead bit to the most significant bit position of the pentad if the overhead bit is not at the most significant bit position.

9. The method of claim 8 further comprising the step of converting the plurality of pentads to an output data having the same specified format as the input frame.

10. The method of claim 8 wherein in the framing step, searching for an F-bit in the pentad, an F-bits alignment being found when an F-bit is placed at a consistent location for a predetermined number of input frames.

11. The method of claim 10 wherein the F-bits alignment is found when the input frame contains F-bits having a binary sequence of "1001".

12. The method of claim 8 wherein in the framing step, searching for an M-bit alignment of the pentad, the M-bit alignment being found when the M-bit is placed at a consistent location for a predetermined number of input frames.

13. The method of claim 12 where in the M-bit alignment is found when the input frame contains M-bits having a binary sequence of "010".

14. The method of claim 8 wherein in the framing step, determining if the pentad is in-frame such that the overhead bit in the pentad is at the most significant bit position.

15. The method of claim 8 further comprising the step generating timing markers associated with the pentad that represents an overhead time.

16. A method for framing an input stream having a plurality of frames, comprising the steps of:
    receiving the plurality of frames, each frame having a plurality of pentads;
    searching for an F-bit alignment of a pentad in a first frame by examining if any of the bits in the pentad matches an expected F-bit, comprising the steps of:
        if none of the bits in the pentad matches the expected F-bit, searching a subsequent pentad in the first frame; and
        if at least one bit of the pentad in the first frame matches the expected F-bit, confirming the expected F-bit by searching a second frame for the expected F-bit in the corresponding bit of a corresponding pentad in the second frame; and
        upon confirming the bit in the pentad to be the expected F-bit, correcting a block count to a timing unit and informing a barrel shifter to place the expected F-bit in the most significant bit location of the pentad.

17. The method of claim 16 wherein in the searching step, comprising the step of analyzing an M-bit alignment if the searching step results in consistent F-bit alignment in a predetermined set of frames.

18. The method of claim 16 further comprising the steps of determining if the expected F-bit first frame is in-frame, the first frame being in-frame if the expected F-bit is at the most significant bit location of the pentad.

19. The method of claim 16 further comprising the step of returning to the searching step if a frame is mis-aligned.

* * * * *